(12) United States Patent
Jones et al.

(10) Patent No.: US 12,471,585 B2
(45) Date of Patent: *Nov. 18, 2025

(54) FLY FISHING REEL WITH BRAKE ASSEMBLY AND METHODS

(71) Applicants: Cary Hogan Jones, Joliet, MT (US); George Stickler, Red Lodge, MT (US)

(72) Inventors: Cary Hogan Jones, Joliet, MT (US); George Stickler, Red Lodge, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,296

(22) Filed: Nov. 28, 2023

(65) Prior Publication Data

US 2024/0090483 A1   Mar. 21, 2024

Related U.S. Application Data

(63) Continuation of application No. 17/157,913, filed on Jan. 25, 2021, now Pat. No. 11,864,543.

(51) Int. Cl.
*A01K 89/016*   (2006.01)
*A01K 89/0155*  (2006.01)

(52) U.S. Cl.
CPC ...... *A01K 89/016* (2013.01); *A01K 89/01557* (2015.05)

(58) Field of Classification Search
CPC .. A01K 89/02; A01K 89/033; A01K 89/0155; A01K 89/01557; A01K 89/016; A01K 89/056; A01K 89/058; A01K 89/047; A01K 89/057
USPC ........................................................ 242/292
See application file for complete search history.

(56) References Cited

U.S. PATENT DOCUMENTS

| 948,026 | A | * | 2/1910 | Scotchmer | ....... A01K 89/01557 191/95 |
| 1,444,560 | A | * | 2/1923 | Schmid | ........... A01K 89/01557 242/319 |
| 1,566,594 | A | * | 12/1925 | Graham | ........... A01K 89/01557 242/317 |
| 2,967,676 | A | * | 1/1961 | Klingberg | ............ A01K 89/033 254/26 R |

(Continued)

FOREIGN PATENT DOCUMENTS

| JP | 10304799 A | * | 11/1998 | ......... A01K 89/0155 |
| JP | 2000253783 A | * | 9/2000 | ............ F04D 25/08 |
| KR | 960005282 Y1 | * | 6/1996 | |

*Primary Examiner* — Anna M Momper
*Assistant Examiner* — Henrix Soto
(74) *Attorney, Agent, or Firm* — Holland & Hart LLP

(57) ABSTRACT

A fishing reel and related method include a housing, a spool, and a brake assembly. The housing includes an external circumferential surface and an internal circumferential surface. The spool is configured to have a length of fishing line wound thereon, and is rotatable relative to the housing about a rotation shaft. The brake assembly is mounted to and rotatable with the spool. The brake assembly includes a plurality of pivotally mounted pawls. The plurality of pawls each include a contact surface arranged facing the internal circumferential surface. Rotation of the fishing reel upon the fishing line being pulled out of the fishing reel when a fish pulls on the fishing line causes a centrifugal force that moves the contact surface of the plurality of pawls into contact with the internal circumferential surface to reduce a rotational speed of the spool relative to the housing.

20 Claims, 11 Drawing Sheets

(56) References Cited

U.S. PATENT DOCUMENTS

| | | | | |
|---|---|---|---|---|
| 3,944,160 | A * | 3/1976 | Cooper | A01K 89/01557 188/186 |
| 4,718,617 | A * | 1/1988 | Vadasz | A01K 89/02 242/243 |
| 5,542,619 | A * | 8/1996 | Karlsson | A01K 89/0155 188/82.7 |
| 6,065,699 | A * | 5/2000 | Sacconi | A01K 89/016 242/286 |
| 6,076,640 | A * | 6/2000 | Carlson | A01K 89/01557 188/82.1 |
| 6,126,105 | A * | 10/2000 | Yamaguchi | A01K 89/01555 188/164 |
| 6,193,182 | B1 * | 2/2001 | Capra | A01K 89/016 242/301 |
| 6,254,021 | B1 * | 7/2001 | Morimoto | A01K 89/01557 242/301 |
| 7,618,003 | B2 * | 11/2009 | Rho | A01K 89/01555 188/181 A |
| 8,534,585 | B2 * | 9/2013 | Saito | A01K 89/0155 242/301 |
| 8,985,492 | B2 * | 3/2015 | Niitsuma | A01K 89/0155 188/181 A |
| 9,101,120 | B2 * | 8/2015 | Hyun | A01K 89/0155 |
| 9,578,860 | B2 * | 2/2017 | Geisel | A01K 89/033 |
| 9,635,843 | B2 * | 5/2017 | Ikebukuro | A01K 89/045 |
| 11,864,543 | B2 * | 1/2024 | Jones | A01K 89/01557 |

* cited by examiner

FLY FISHING REEL WITH BRAKE ASSEMBLY AND METHODS

CROSS REFERENCE TO RELATED APPLICATION

This application is a continuation of U.S. patent application Ser. No. 17/157,913, filed Jan. 25, 2021, entitled "FLY FISHING REEL WITH BRAKE ASSEMBLY AND METHODS," the disclosure of which is incorporated herein by reference in its entirety.

TECHNICAL FIELD

The present disclosure relates generally to fishing reels, and more particularly relates to fly fishing reels with brake assembly and related methods of use.

BACKGROUND

It is common for fishing reels, rods and fly lines to brake when a fish first is on the line. As the fish pulls the line, conventional reels allow the fly line tippet to unreel subject to settings on the reel-cast brake. The bulk of the stress on the line and rod come within the first 5 revolutions of the reel, due to start-up inertia resulting from overcoming the friction applied by the reel-cast brake. The line quickly goes from a steady state to a released/unwinding state as the fish pulls the line. On the other hand, if the reel is permitted to freely spin in response to line tension, when that tension ends, the inertia will continue to unreel the line, causing the line to "backlash" or "bird nest" (i.e., come all unwound, loose and tangled within the reel). Other solutions are cumbersome, such as an option to adjust the "drag" on the line to loosen then tighten, or use of a slack line or palming the reel. Other solutions may exist for closed reels, such as the use of disk drags or clasping the line between the angler's finger and the rod handle.

Opportunities exist for improvements in fishing reels to avoid the problems with backlash while also reducing the start-up inertia on the line or rod when a fish first is on the line.

SUMMARY

One aspect of the present disclosure relates to a fishing reel that provides a fishing line to unreel while minimizing the start-up inertia when a fish first pulls on the line. In response to centrifugal forces, the brake pawls (and brake pads at the outer ends of the pawls) move outward to contact the housing and thereby slow the rotational speed of the spool. Biasing members, such as cantilever springs, may be used to urge the brake pawls back toward the center of rotation, away from contact with the housing. A damping member, such as an O-ring or rubber band may provide a stop for the pawls as they return toward the center of rotation under the biasing forces of the spring, thus preventing noise and rattling. Spring-loaded detent may travel into and out of recesses to slow rotation, such as rotation that leads to backlash. The brake assembly in the reel may be reversibly mounted to the spool to convert the fishing reel between left hand and right hand arrangements.

Another aspect of the present disclosure relates to a fishing reel that includes a housing, a spool, and a brake assembly. The housing includes an external circumferential surface and an internal circumferential surface. The spool is configured to have a length of fishing line wound thereon, and is rotatable relative to the housing about a rotation shaft. The brake assembly is mounted to and rotatable with the spool, and includes a mounting plate and a plurality of pawls pivotally mounted to the mounting plate. The plurality of pawls each include a contact surface arranged facing the internal circumferential surface. Rotation of the fishing reel upon the fishing line being pulled out of the fishing reel when a fish pulls on the fishing line causes a centrifugal force that moves the contact surface of the plurality of pawls into contact with the internal circumferential surface to reduce a rotational speed of the spool relative to the housing.

The plurality of pawls may be biased away from contacting the internal circumferential surface by a plurality of biasing members. The plurality of biasing members may include a flexible wire. The plurality of pawls may include at least two pawls. The contact surface of each of the plurality of pawls may be defined by a brake pad. The brake pad may include a polymer material or natural material such as cork. The brake pad may be formed separately and attached to an elongate arm portion of a respective one of the plurality of pawls.

The fishing reel may include at least one detent member removably positioned in a plurality of recesses as the spool rotates relative to the housing. The at least one detent member may be carried by the spool, the plurality of recesses may be formed in the housing, and the at least one detent member may be biased into a position extending into one of the plurality of recesses. The brake assembly may be reversibly mounted to the spool to change the fishing reel from a left handed reel to a right handed reel. The spool may include a hollow tube and first and second side plates positioned at opposite ends of the hollow tube, and the spool may be configured to have the length of fishing line wound on the hollow tube between the first and second side plates.

A further aspect of the present disclosure relates to a fishing reel that includes a housing having a radially inward facing surface, a spool configured to have a length of fishing line wound thereon and being rotatably mounted to the housing, and a brake assembly. The brake assembly includes at least one pawl, the at least one pawl has a contact surface arranged to contact the radially inward facing surface to create a braking force that reduces a rotation speed of the spool relative to the housing, and the brake assembly is reversibly mounted to the spool in a first position providing a right hand arrangement for the fishing reel and a second position providing a left hand arrangement for the fishing reel.

The at least one pawl may be pivotally mounted to a mounting plate. The at least one pawl may include at least four pawls arranged circumferentially. The at least one pawl may be movable into contact with the radially inward facing surface upon application of a centrifugal force when fishing line is drawn out of the fishing reel by a caught fish.

A further aspect of the present disclosure relates to a method of operating a fishing reel. The method includes providing a housing, a spool, and a brake assembly mounted to the spool. The spool is rotatably mounted to the housing and has fishing line wound thereon. The brake assembly including a plurality of pivotally mounted pawls that each include a contact surface, and the spool is configured to have a length of fishing line wound thereon. The method also includes moving the contact surface of the plurality of pawls into contact with the housing to create a braking force that slows down rotation of the spool upon application of a centrifugal force when the fishing line is pulled by a fish.

Moving the contact surface of the plurality of pawls into contact with the housing may include engaging the contact surface against a contoured, radially inward facing surface of the housing. The brake assembly may be reversibly mounted to the spool, and the method further includes mounting the brake assembly to the spool in a first orientation to provide a right handed fishing reel, detaching the brake assembly from the spool, flipping the brake assembly relative to the spool, and attaching the brake assembly to the spool in a second orientation to provide a left handed fishing reel.

Moving the contact surface of the plurality of pawls into contact with the housing may include moving the plurality of pawls in a radially outward direction. The fishing reel may further include at least one detent member biased into at least one recess, and rotation of the spool relative to the housing may move the at least one detent member into and out of the at least one recess.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
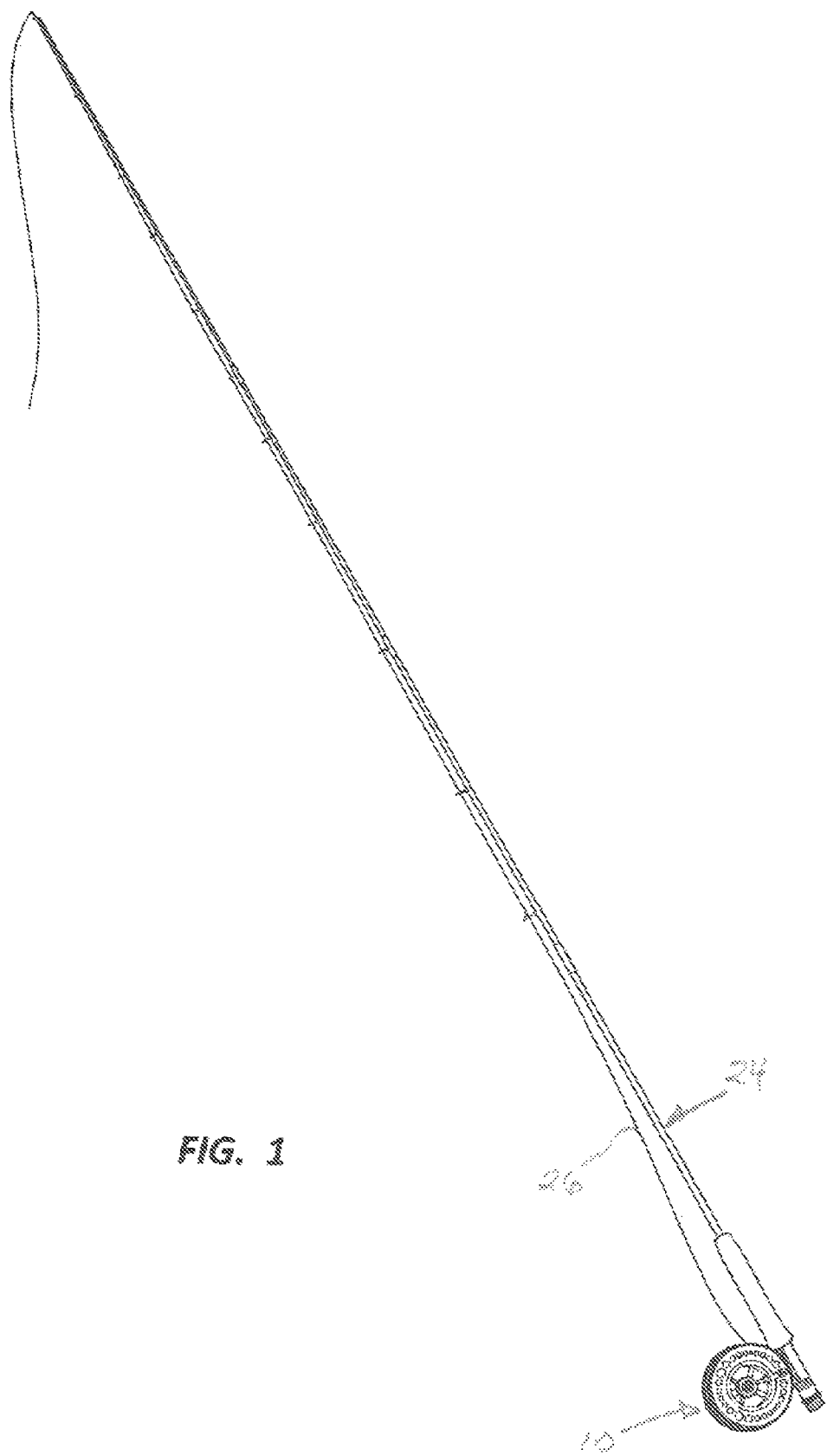
FIG. 1 is a perspective view of an example fishing reel mounted to a fishing rod in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, and devices may individually or collectively be components of a larger system, wherein other procedures may take precedence over or otherwise modify their application.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, with reference to the accompanying figures, the present disclosure generally is directed to a fishing reel, and particularly a fly fishing reel. In its basic form, the fishing reel includes a reel housing, a reel spool, and a brake mechanism. The spool may include a hollow tube that can be manufactured in various diameters. The larger the diameter the more line that the reel retrieves per revolution. These reels are called large arbor reels. The reel spool has multiple purposes, including to retrieve the line after it is pulled from the spool, and to hold the fishing line and backing once it is retrieved.

The reel spool may also include two plates on the sides of the tube. These plates extend upward from the outer diameter of the tube. The function of the plates is to guide the line back onto the spool and then keep the line on the spool after the line is retrieved. The reel spool also includes a bearing housing receptive of a set of bearings. The bearings allow the spool to freely rotate relative to the reel housing. The reel spool may further include a reel handle to rotate the spool to wind the fishing line on the spool, and a reel counterweight to maintain balance in the rotating spool.

The line may be pulled from the reel spool due to several events. One event is when the fish pulls the line from the reel during the fish's fight to get off the line. The other event is when the angler pulls the line off of the spool.

The reel housing is a component that brings the rod and the spool together to function as one unit. The reel housing may include a reel cage, a spindle around which the bearing spins, and a reel foot. The reel spool spins inside the reel cage. The reel cage has a spindle, which the bearing slides over in a manner that will allow the reel spool to spin freely. The reel foot attaches the rod to the reel.

The brake mechanism is mounted to the spool and interposed between the housing and spool. A brake mechanism in a fly fishing rod is often referred to by fishermen as a "drag system." Drag systems for fly fishing reels come in two major types: a click and pawl system, and a disk drag system. The click and pawl system typically provides ample braking force; however, it typically does not provide a smooth start up. The disk drag system has become more popular over time such that most reels used for fly fishing today include the disk drag system.

There are two types of disk drag systems: the draw bar system, and the enclosed disk drag system. Both of these disk drag brake systems provide adequate braking power, so selection between them is typically based on the type of environment in which the reel is being used. The disk drag system has become popular in the saltwater fishing world because of its reliable stopping power and because the parts are sealed. Being sealed simply allows less corrosion from the environment.

Research has shown that there is no single method among anglers to set drag tension. Regardless of the targeted fish species or the skill level of the angler, the desired outcome is not to break the line while fighting the fish. There are many scenarios that will break the line, but the major purpose of this invention is to reduce the risk of the line breaking due to the drag system at startup (i.e., when the fishing line begins to unwind from the spool when a fish first pulls on the line) and/or to add additional braking force over time and distance.

Along with the numerous advantages of the click and pawl and the disk drag brake systems, there is one disadvantage. The inherent problem with both systems is what is known as "startup inertia" when the spool goes from a rest state to a fast rotating state. Naturally, the force applied to put an object into motion or stop an object has to be larger than the forces acting on that object before starting/stopping. A reel spool at rest could be difficult to start if the drag on the reel were set too high. If the drag system is set too low, startup inertia is avoided, but then there is insufficient force provided by the reel to slow down the fish and/or to avoid backlash. In either situation, the fish may break the line by swimming too far away or swimming into a snag, to name a few scenarios.

The fishing reels of the present disclosure address the challenges associated with "startup inertia" in existing reels. The fishing reels disclosed herein limit the amount of startup inertia required to overcome the reel's brake system. The reels of the present disclosure also can apply a variable braking force in a controlled manner over a period of time and/or over a given distance. The brake system applies braking forces in a way that are determined by how fast the fish swims (i.e., the rotation speed of the spool).

The reel housing provides multiple functions, one of which is to act as a brake drum for the brake system. The brake pawls, which are attached to the reel spool, will gradually apply pressure to the brake drum as the reel spool spins faster. The centrifugal forces acting on the pawls as the spool rotates moves the pawls radially outward into contact with the housing, thereby applying a braking forces that gradually slows down the spool rotation speed and reducing the speed of the fleeing fish.

The reel housing may also include a plurality of detect recesses that receive a detent follower that is carried by the spool. In other embodiments, the spool includes the recesses and the follower is carried by the housing. The follower typically is biased into the recesses by a biasing member. Moving the follower into and out of the recesses as the spool rotates relative to the housing provides rotational resistance. The recesses may be arranged in a circle.

The spool and brake mechanism may be attached to each other at a plurality of connection points. For example, the spool may include a plurality of threaded holes on an inside circumference that are receptive of a plurality of fasteners used to connect a mounting plate of the brake mechanism to the spool.

The brake mechanism includes an inner plate and an outer plate. The pawls are sandwiched between the plates. The assembly of the inner and outer plates and the pawls can be connected to the spool in reversible orientations to create a left hand reel arrangement or a right hand reel arrangement.

The brake pawls are arranged and configured to provide greater braking force as the spool velocity increases. The greater the spool velocity, the more the pawls move radially outward into contact with the housing to increase the braking force applied. Several variables may influence the amount of braking force for a given spool velocity, such as a diameter of a spring that biases the pawl toward the rotation axis, a weight of the pawl, and a hardness and composition of a brake pad carried by the pawl. The pawl moves in a radially outward direction toward the reel housing to create a frictional force on the reel housing. This force will cause a redirected force to the reel spool and in return more braking force to the line. By balancing the spring force, the pawl weight, and the brake pad properties, among other things, it is possible to create a gradual application of a braking force applied to the line, thus minimizing the risk of breaking the line.

A spring stop may protrude from one of the plates of the brake mechanism. A free end of the spring stop may rest on the inside of the opposite plate. The spring stop gives the spring a structure to "pull" against when the brake pawl is activated. Typically, there is one spring stop for each spring and associated pawl. However, in some embodiments there may be multiple springs associated with a given spring stop and/or pawl.

A brake pawl stop may be located inside the brake mechanism. The brake pawl stop allows the brake pawl to stop its downward (i.e., radially inward) motion after activation (i.e., contacting the housing to create a braking force). The stop may provide a dampening effect that reduces the noise of the brake pawl returning to position after activation. The brake pawl stop position may be on a radius surface of the brake mechanism plates. In one example, the brake pawl stop is an O-ring or similar structure that is mounted to one of the plates of the brake mechanism.

Each pawl includes an arm portion that is pivotally connected to one of the brake mechanism plates. In one example, the arm portion has a hole at one end and is attached to a post or fastener to the plate. The arm portion is allowed to pivot at this point in a radially outward motion and then back radially inward after activation. In one example, the arm portion has a length in the range of about 2 cm to about 15 cm. Depending on the materials used for the pawls and the number of pawls used (e.g., their size), the pawls may vary in weight between about 3 grams and about 10 grams, and more particularly about 6 grams each.

The brake pads positioned on the pawls may include any braking material, such as, for example, urethane, cork, carbon fiber, rubber, Delron®, or Rulon®. In one example, the brake pads have a length in the range of about 0.05 cm to about 5.0 cm. The brake pad may have a groove molded therein that allows the brake pad to be placed in a groove in between one of the brake mechanism plates and a brake weight. The plates of the brake mechanism, when secured together, hold the brake pads in the grooves. In some examples, the brake pad is situated on an end of the pawl arm so as to be as far away from its pivot point as possible.

A weight plate may be a permanent fixture attached to the end of the pawl arm. The weight plate may include multiple holes that are used to attach the weight plate to the weight and receive a set screw to hold the spring into a spring groove. The spring groove may be formed on an inside radius of the weight plate.

A pawl weight may be positioned over the weight plate and have a corresponding weight plate shape. The pawl weight may include a groove formed from one end to the other in a diagonal direction (i.e., from outside top to inside bottom). The return spring is placed in this groove and held in place by the set screw. The pawl weight can vary in weight from, for example, about 0.5 grams to about 10 or more grams. The pawl weight can be formed from various materials such as, for example, brass, aluminum or stainless steel. A groove may be formed on an inside radius of the pawl weight to allow the brake pad to fit therein. This groove corresponds with the weight plate groove. In at least some examples, the weight is situated on the end of the pawl arm as to be as far away from its pivot point as possible. The weight may include multiple holes formed therein for the purpose of attaching and securing the weight to the weight plate.

The return spring may be made from, for example, a high carbon wire. The return spring may have a diameter in the range of, for example, about 0.009 inches to about 0.03 inches. The spring may be placed in the groove formed in the pawl weight and held in place by the spring wire set screw when the pawl weight and weight plate are fastened together. The spring wire protrudes beyond the inside edge of the pawl weight and weight plate. The spring wire extends toward the pawl arm pivot point and is placed under the spring stop. The spring may hold the pawl in place and help bring the pawl back into position after activation.

Another variable in fly fishing reels is whether the fisherman reels with the right hand or left hand. The reels of the present disclosure may be configured to permit switching between a right hand reel arrangement and a left hand reel arrangement by flipping the brake mechanism relative to the housing and spool. By flipping the brake assembly over, the brake pawls will now rotate in the opposition direction. After rewinding the line on the reel spool in the opposite direction, the angler can now use the reel for the opposite hand.

FIG. 1 is a perspective view of an example fishing reel in accordance with the present disclosure. The reel is mounted to a handle portion of a fishing rod 24. Fishing line 26 is wrapped around a spool member of the fishing reel 10 and extends through eyelets of the rod 24. A free end of the line 26 shown in FIG. 1 may have a hook, bait, lure, or other fishing tackle mounted thereto. Typically, when the rod and reel combo shown in FIG. 1 is in use, a user casts the line without onto a body of water where a fish engages the line and the user operates the reel 10 to bring the fish closer to the user.

The fishing reel 10 is shown in FIG. 1 arranged for a right handed use where the user holds the handle portion of the rod 24 with the right hand and operates the reel 10 using the left hand. This arrangement is further shown in FIGS. 2-5 and 8-10. The reel 10 may be adapted into a left hand arrangement wherein the user grasps the handle of the rod 24 with his left hand and operates the reel with the right hand. Further details regarding the reversibility of the reel between left and right handed arrangements is discussed below.

FIG. 1 shows the reel 10 attached to a fly fishing rod. Generally, the example shown in the figures illustrates a fishing reel 10 that is used primarily for fly fishing and/or in combination with a fly fishing rod. However, the general principles and various features of the fly reels disclosed herein may be used for other types of fishing rods and various types of fishing styles.

Figure 2:
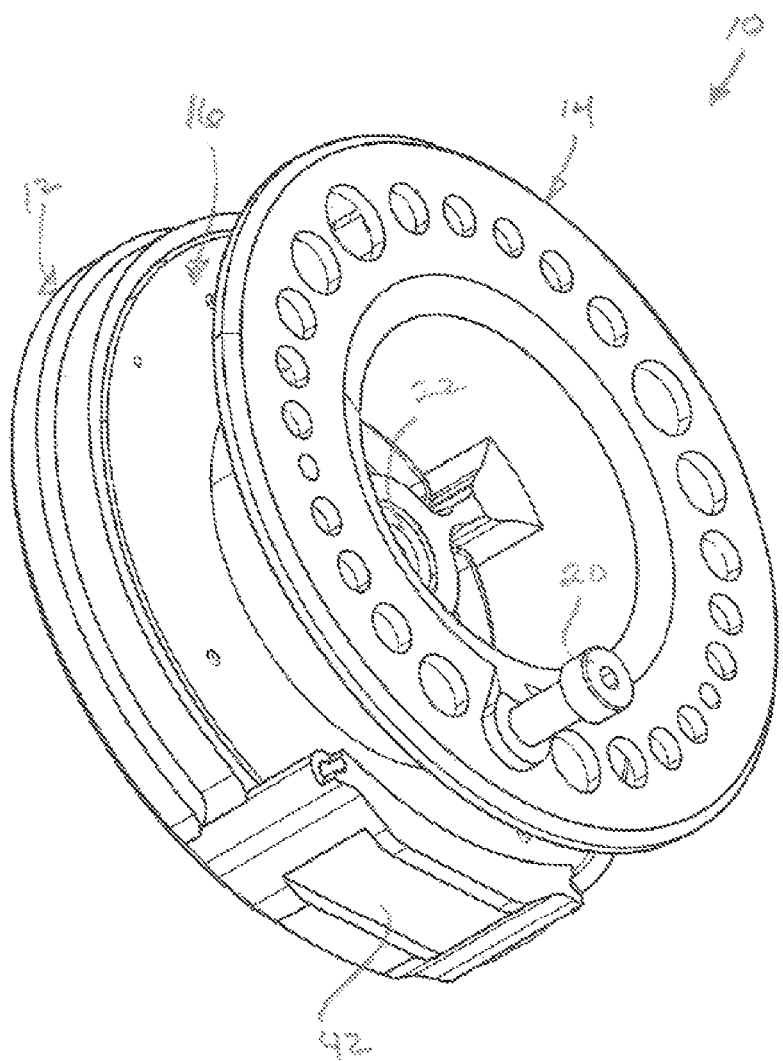
FIG. 2 is a perspective view of the fishing reel shown in FIG. 1. In a right hand arrangement.

Referring now to FIG. 2, the fishing reel 10 is shown including a housing 12, a spool 14, and a brake assembly 16. A handle 20 may be mounted to the spool 14 and used by the user to rotate the spool 14 relative to the housing 12 to wrap the fishing line around a portion of the spool 14. The housing 12 may include a rod mount 42, used to secure the fishing reel 10 to a fishing rod, such as the rod 24 shown in FIG. 1. The brake assembly 16 is typically mounted directly to the spool 14, as described in further detail below. The spool 14 with brake assembly 16 mounted thereto is rotatably mounted to the housing 12 via one or more bearings 22. Thus, the housing 12 remains fixed relative to the fishing rod via the rod mount 42, and the spool 14 and brake assembly 16 rotate relative to the housing 12.

As noted above, the fishing reel 10 shown in FIG. 2 is configured as a right handed fishing reel. The fishing reel 10 is oriented in the right hand or left hand position relative to the rod orientation shown in FIG. 1. When the fishing rod 24 is in an operational position, as shown in FIG. 1, and the handle 20 is positioned on the left hand side, so that the user's left hand can rotate a spool 14 while holding the rod 24 in his right hand, the fishing reel is considered a right handed reel. The fishing reel is considered a left handed reel when the fishing reel is arranged such that the handle 20 is exposed on the right hand side of the rod 24 such that the user can hold the rod 24 in his left hand and rotate the spool 14 via the handle 20 with his right hand.

Figure 3:
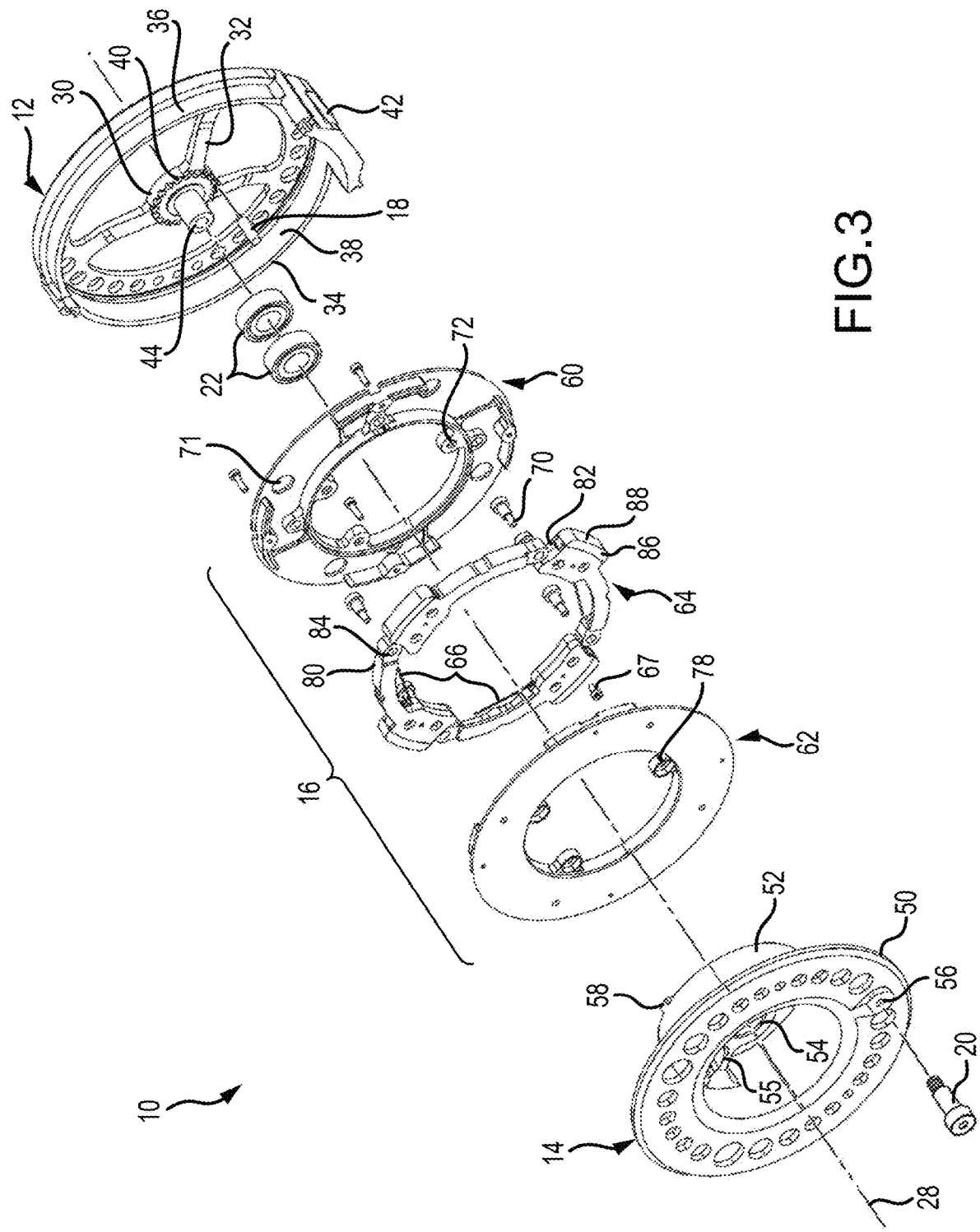
FIG. 3 is an exploded perspective view of the reel arrangement shown in FIG. 2.
Figure 4:
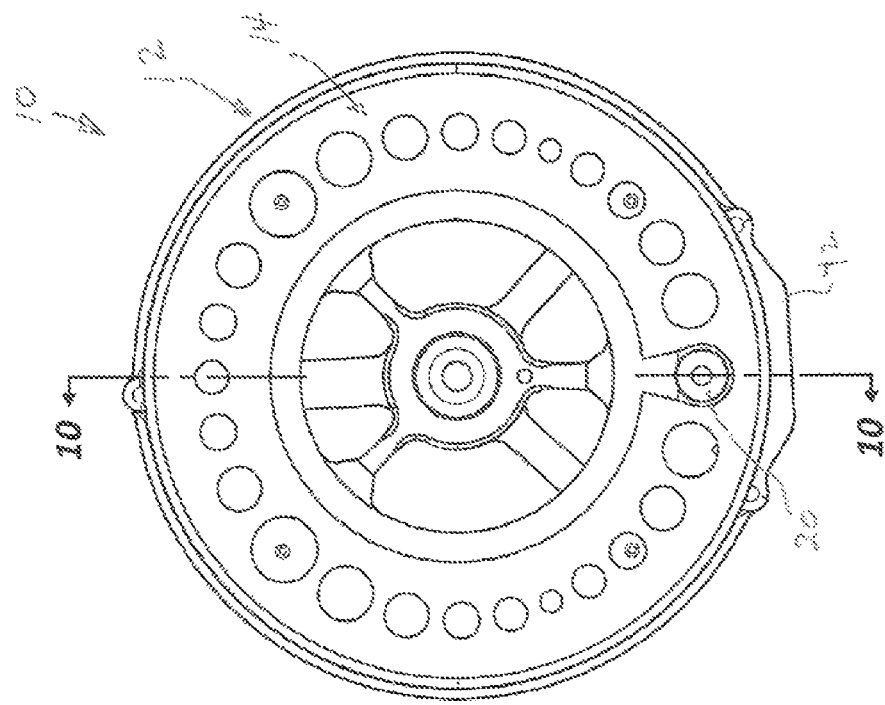
FIG. 4 is a front view of the fishing reel shown in FIG. 2.
Figure 5:
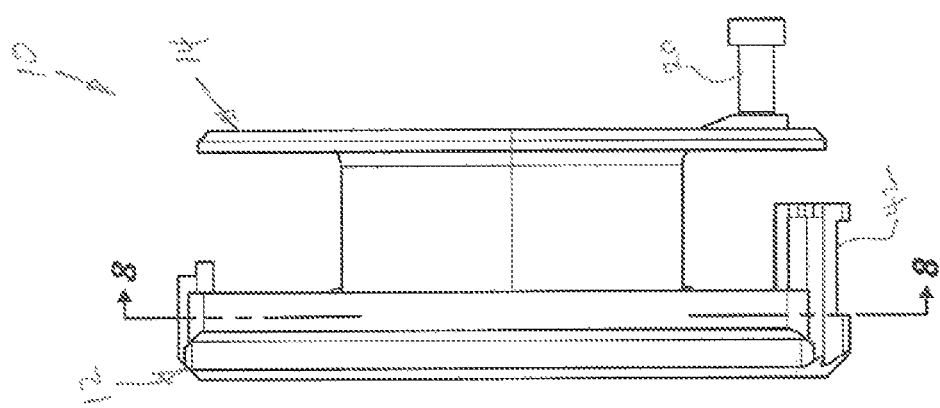
FIG. 5 is a side view of the fishing reel shown in FIG. 2.

FIG. 3 shows the fishing reel components in an exploded perspective view with the components spaced apart along a longitudinal axis 28. The housing 12 includes a spindle 30, a plurality of spaced apart supports 32, a rim or cage 34 having outer and inner surfaces 36, 38, a plurality of spaced apart detent recesses 40, the rod mount 42 described above, and a bearing shaft 44. The supports 32 interconnect the spindle 30 with the rim or cage 34. Three supports 32 are shown, but other embodiments may include fewer or more supports, or the supports 32 may be replaced with a plate-like structure that is solid and continuous. The use of a plurality of spaced apart supports may help reduce the weight of the housing 12, as compared to using a solid or semi-solid plate structure.

The inner surface 38 of the rim or cage 34 may function as a brake surface against which features of the brake assembly 16 intermittently engage with to provide a braking force that slows down rotation of the spool 14. The detent recesses 40 may releasably receive a detent follower 18 to provide a resistance to rotation of the spool 14 relative to the housing 12 that is separate from the braking force applied by the brake assembly 16. Further details regarding the detent follower 18 and detent recesses 40 and their interface and related function are described in further detail below.

The bearing shaft 44 may provide an interface and supporting structure for the bearings 22. In at least one example, the bearings 22 are mounted to the bearing shaft 44. Two bearings 22 are shown in the drawings, and the bearings 22 are positioned axially relative to each other. Other embodiments may include a single bearing or three or more bearings. In at least one example, the bearings 22 are press fit or secured with an interference fit to the bearing shaft 44. In other examples, the bearings 22 are secured to the spool 14 using, for example, a press fit or interference fit connection. Other types of connections, such as welding or fasteners, may be possible between the bearings 22 and one or both of the housing 12 and spool 14.

The spool 14 includes a base plate 50, a tube 52, a bearing mount 54, a brake mount 58 and a handle seat 56. The base plate 50 may include a plurality of holes or cavities that may be provided in order to reduce the overall weight of the spool 14. The tube 52 may be configured to have the fishing line 26 wound thereon. The tube 52 may have a variety of different diameters. Typically, the diameter of tube 52 is in the range of about 1 inch to about 3 inches. The diameter of the tube 52 may influence the functionality of the fishing reel 10 such as, for example, the ease of and/or speed of wrapping up the fishing line 26 on the spool 14 relative to the number of rotations of the spool.

The bearing mount 54 may be sized to receive one or both of the bearings 22 therein. The bearing mount 54 may be secured to the tube 52 with one or more struts or supports 55, as shown in FIG. 3. The use of struts 55 instead of a solid structure, such as a plate-type structure, may help reduce the overall weight of the spool 14 and may provide preferred strength versus weight ratio for the spool 14 generally.

As shown in FIG. 3, the brake assembly 16 includes a mounting plate 60, a backing plate 62, and a plurality of pawls 64. FIG. 3 shows the mounting plate 60, backing plate 62 and pawls 64. These components may be assembled together as the brake assembly 16 and secured together using, for example, fasteners or the like to provide an assembly that is releasably mounted to the spool 14. As discussed above, the brake assembly 16 may be detached from the spool and flipped between the orientation shown in FIGS. 2-4 (i.e., the right hand arrangement for the fishing reel 10) and the arrangement show in FIGS. 6 and 7 (i.e., the left hand arrangement for the fishing reel 10). The brake assembly 16 is mounted to the spool 14 at the plurality of brake mounts 58 shown in FIG. 3. The spool 14 includes a plurality of brake mounts 58 to which the brake assembly 16 is mounted. The brake assembly 16 is mounted using the spool mounts 78 of the backing plate 62 when in the right hand position, or the spool mounts 72 when the brake assembly 16 is in the left hand position relative to the spool 14.

In at least some arrangements, the brake assembly includes, at a minimum, the plurality of pawls 64. The pawls 64 may be reversibly mounted relative to the spool to provide left hand or right hand arrangements for the fishing reel 10. The brake assembly 16 may or may not also include one or both of the mounting plate 60 and backing plate 62. The pawls 64 may be mounted directly to the one or both of the mounting plate 60 and backing plate 62, or mounted directly to the spool 14. In some arrangements, the mounting plate 60 and/or the backing plate 62 may be integrated into the spool 14, such as being integrally formed as a single piece with spool 14.

The mounting plate 60 includes a plurality of pawl posts 70 and the spool mount 72. The pawl posts 70 may be mounted within openings 71 in the mounting plate 60. The pawls 64 may be pivotally connected to the mounting plate 60 with the pawl posts 70. In at least some examples, the pawl posts 70 are mounted to the backing plate 62 rather than the mounting plate 60. Generally, the features of mounting plate 60 may be interchangeable with the features of backing plate 62.

Figure 7:
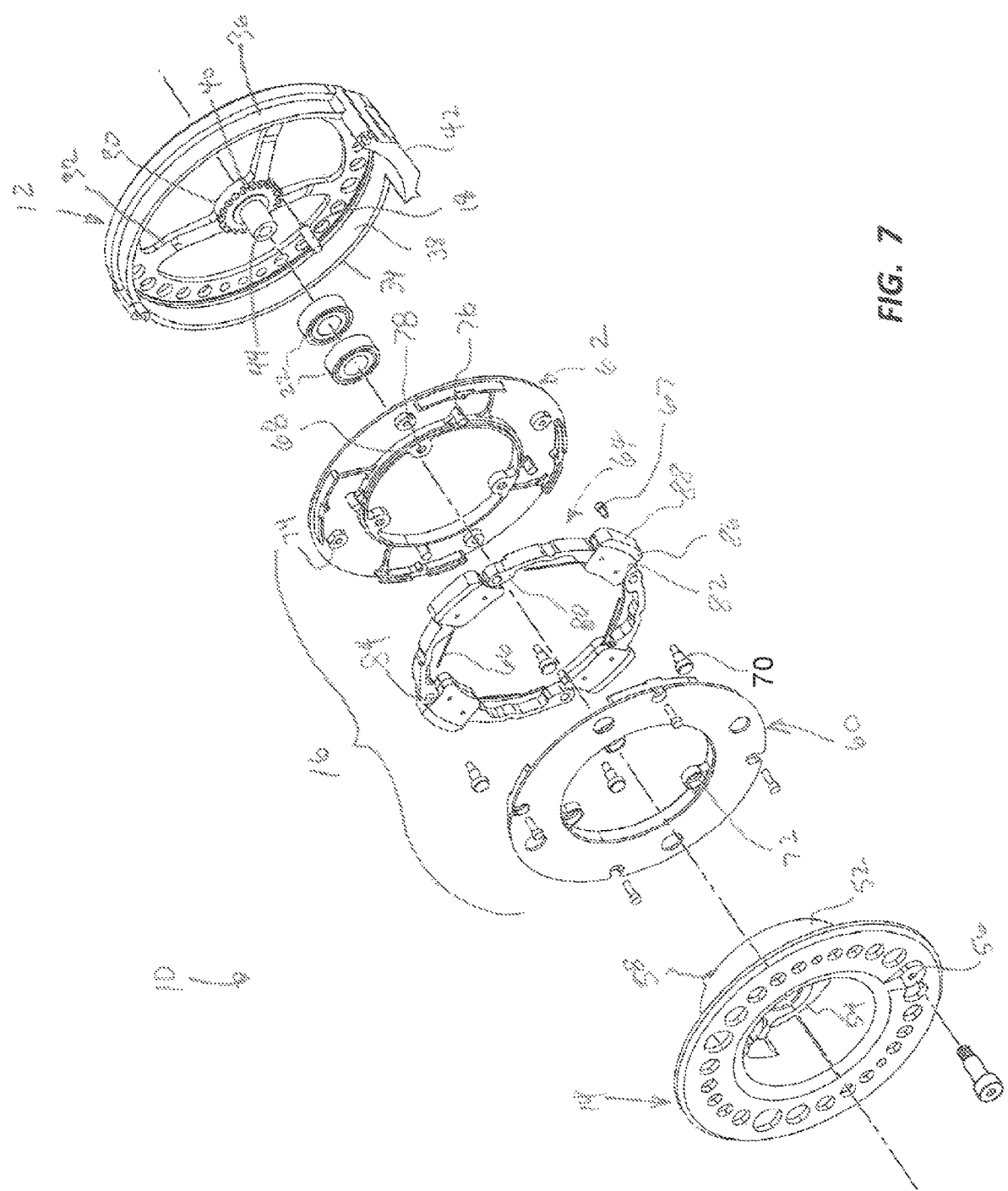
FIG. 7 is an exploded perspective view of the fishing reel shown in FIG. 6.

The backing plate 62 includes post seats 74, spring stops 76, and spool mounts 78 as shown in FIG. 7. In at least some examples, the backing plate 62 may also include a pawl contact surface 68. The surface 68 may provide a dampening function for dampening forces when the pawls 64 move into a radially inward direction. The surface 68 may comprise dampening material such as rubber or foam in the form of, for example, an O-ring or similar replaceable dampening member. The surface 68 may also be defined at least in part by the mounting plate 60.

Figure 8:
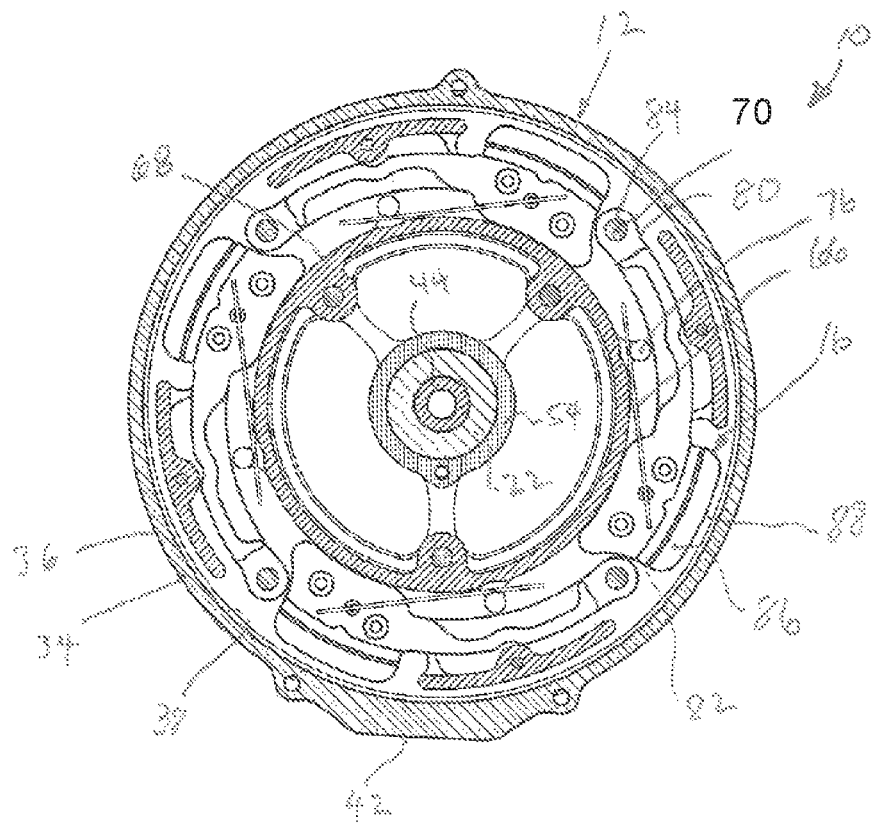
FIG. 8 is a cross-sectional view of the fishing reel shown in FIG. 5 taken along cross-section indicators 8-8, with the brake assembly in a disengaged position.
Figure 9:
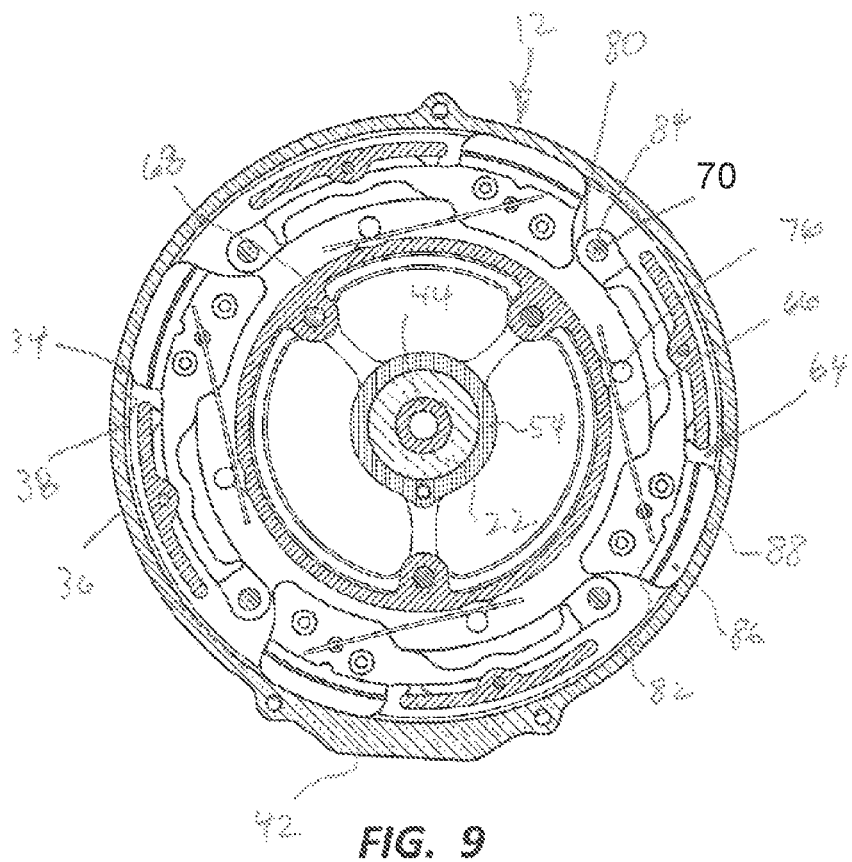
FIG. 9 is a cross-sectional view of the fishing reel shown in FIG. 5 taken along cross-section indicators 8-8, with the brake assembly in the engaged position.

The post seats 74 of the backing plate 62 may be receptive of a portion of the pawl post 70 for alignment or other purposes. The spring stops 76 may define a surface against which a plurality of spring wires 66 may contact. The spring wires 66 may be releasably mounted to the pawls 64 using, for example, a spring wire set screw 67 (see FIGS. 3 and 7). The spring wires 66 may be mounted to the pawls 64 at one end, thereby providing a cantilevered, resilient spring member, the free end of which contacts one of the spring stops 76 as shown in FIGS. 8 and 9.

When assembled, the pawls 64 move radially outward under centrifugal forces generated when the spool 14 is rotating. The pawls move against the biasing forces of the spring wires 66. A comparison of FIGS. 8 and 9 shows that the spring wires 66 are further bent when the pawls 64 are in the radially outward position and in contact with the inner surface 38 of the housing 12. The spring wires 66 provide a biasing force that biases the pawl 64 radially inward and out of contact with the inner surface 38 of housing 12, thereby releasing the braking force when the spool 14 drops below a minimum rotational speed. Typically, the spring wire 66 moves the pawl 64 into contact with the surface 68 of the mounting plate 60 and/or backing plate 62. The dampening material of the surface 68 may reduce the amount of noise, chatter, vibration, or the like when the pawl 64 comes in contact with the surface 68.

The spring wires 66 may comprise a wire material such as, for example, metal piano wire having a diameter in the range of about 0.009 inches to about 0.03 inches. The spring wire may comprise a variety of different materials including, for example, high strength carbon wire or a polymer-based wire.

The pawls 64 may each include first and second ends 80, 82, a mounting aperture 84 at the first end 80, and brake member 86 at the second end 82. The mounting aperture 84 is receptive of one of the pawl posts 70. The brake member 86 defines a contact surface 88, which may be referred to as a brake surface 88. An additional weight member such as a weighted plate may also be positioned at the second end 82. In some arrangements, the weighted plate is mounted at the second end 82, the brake member 86 is mounted to the weighted plate, and one or both of the weighted plate and brake member 86 may be releasably mounted to the elongate pawl 64. The removable mounting of the brake member 86 and/or weighted plate may make it possible to customize performance of the pawl 64. For example, different weights may be added to the pawls, thereby changing the timing of when the pawls 64 move into contact with the inner surface 38 of the housing 12 to create a braking force relative to the rotational speed of the spool 14, and/or changing the amount of braking force applied by the pawls 64 for a given rotation speed of the spool 14. The brake member 86 may have different types of brake material, sizes and/or shapes that influence the braking force and other properties of the brake assembly 16.

The contact surface 88 may have a contoured shape that matches an inner diameter of the inner surface 38 as shown in at least FIGS. 8 and 9. The contact surface 88 may have a generally elongate shape as shown in at least FIGS. 3 and 7. Other embodiments may include other shapes such as a square or circular shape. In at least one example, the brake member 86 comprises a polymer material such as nylon or a natural material such as cork.

Figure 6:
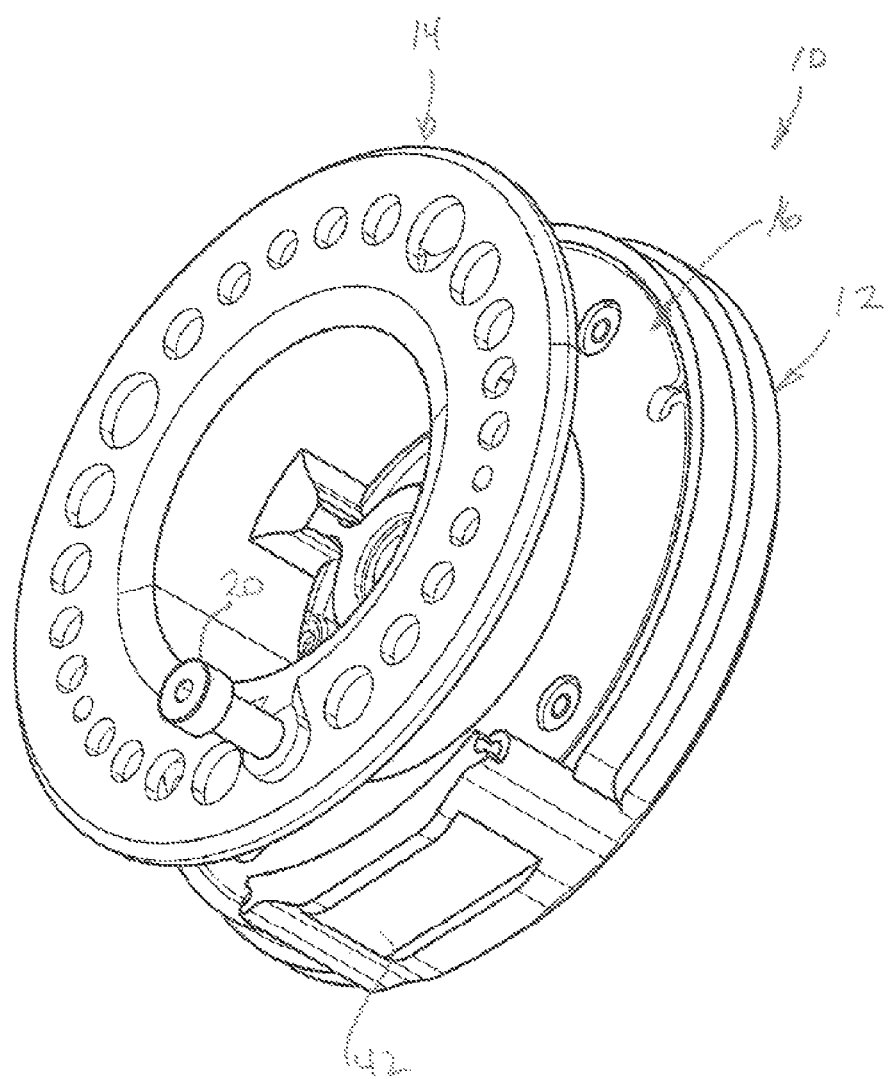
FIG. 6 is a perspective view of the fishing reel of FIG. 1 with the brake assembly flipped to provide a left hand reel.

FIGS. 2-5 show the brake assembly 16 in a right handed arrangement in which the backing plate 62 is closest to the spool 14. FIGS. 6 and 7 show the brake assembly 16 flipped 180 degrees such that the mounting plate 60 is positioned closest to the spool 14 so that the fishing reel is in a left handed arrangement. The brake assembly 16 is intended to perform substantially the same whether in a left handed or right handed arrangement.

Figure 10:
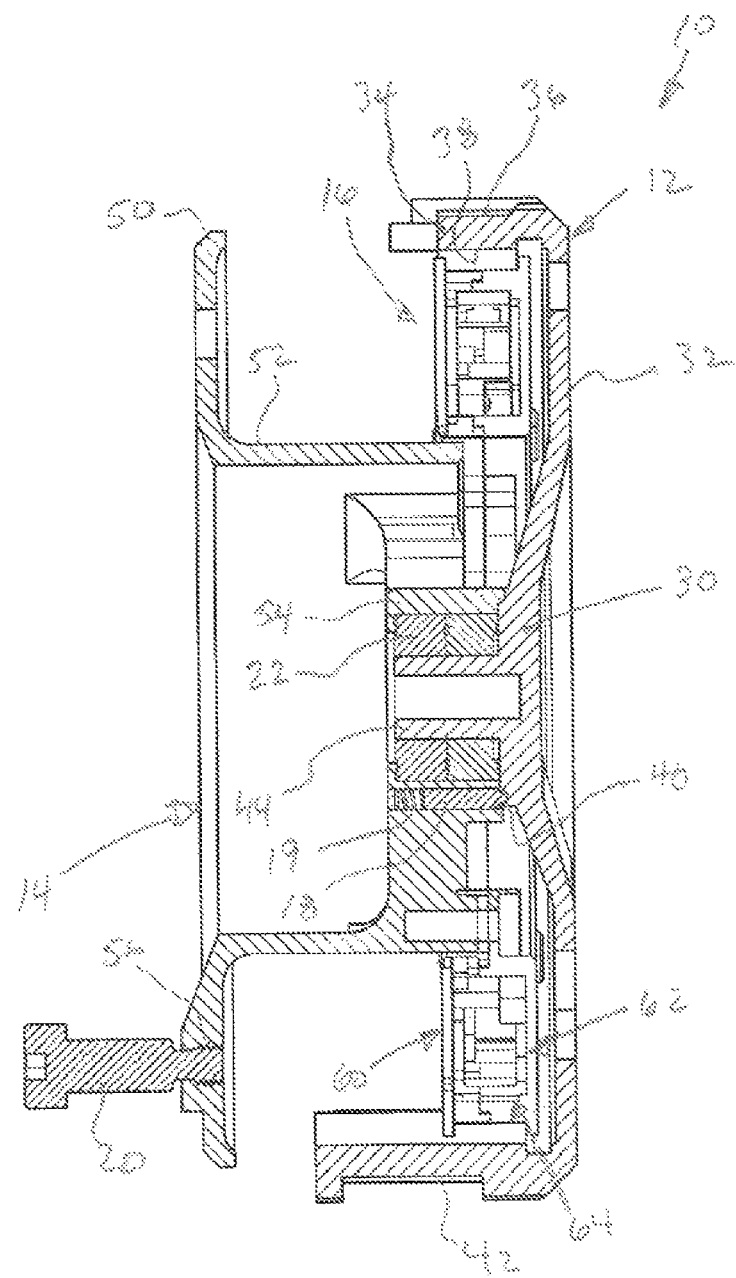
FIG. 10 is a cross-sectional view of the fishing reel shown in FIG. 4, taken along cross-section indicators 10-10.

FIG. 10 shows the detent follower 18, which is carried by the spool 14 and biased by a spring 19 into one of the detent recesses 40 formed in the spindle 30 of the housing 12. The biasing force applied by the spring 19 permits the detent follower 18 to move into and out of the detent recesses 40 as the spool 14 rotates relative to the housing 12. The spring 19 provides sufficient biasing force resist free rotation of the spool 14 relative to the housing 12 such that the spool 14 will not freely spin without application of a rotation force (e.g., applied via the handle 20 or by manually pulling on the line). The resistant to rotation provided by the detent follower 18 may eliminate a free unwinding of the spool 14 relative to the housing 12 that might otherwise cause a loosening or build-up of untensioned line 26 on the spool 14. In one example, the detent follower 18 provides a limited amount of resistance to rotation that permits the user to cast the line 26 with a lure at the free end thereof out onto the water and/or withdrawing of the line 26 by grasping and pulling on the line 26, but stops the spool 14 from rotating once that external force is released. The biasing force applied by the spring 19 may be adjusted using different sizes, shapes or numbers of springs 19. The amount of resistance to rotation provided by the detent follower 18 may also be influenced by the size, shape or arrangement of the detent recesses 40. For example, the smaller the diameter of the ring of detent recesses 40, the more difficult it may be to move the detent follower 18 from one detent recess 40 into another.

Figure 11:
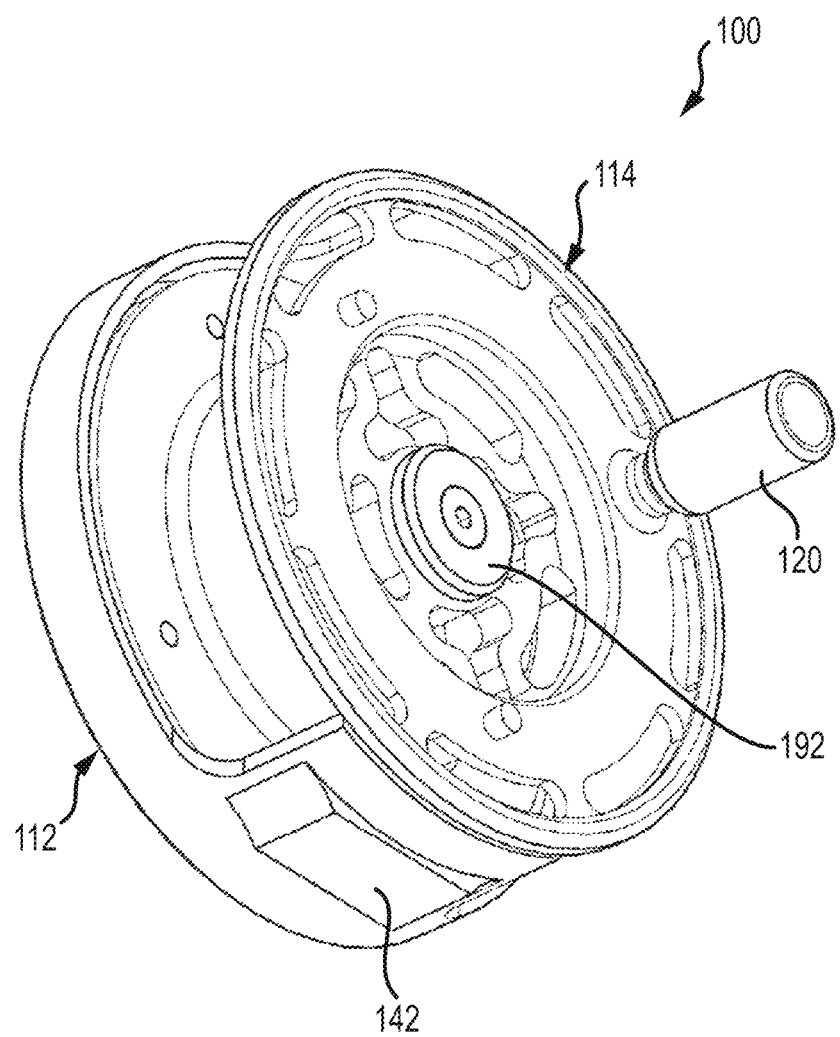
FIG. 11 is a perspective view of another example fishing reel in accordance with the present disclosure.
Figure 12:
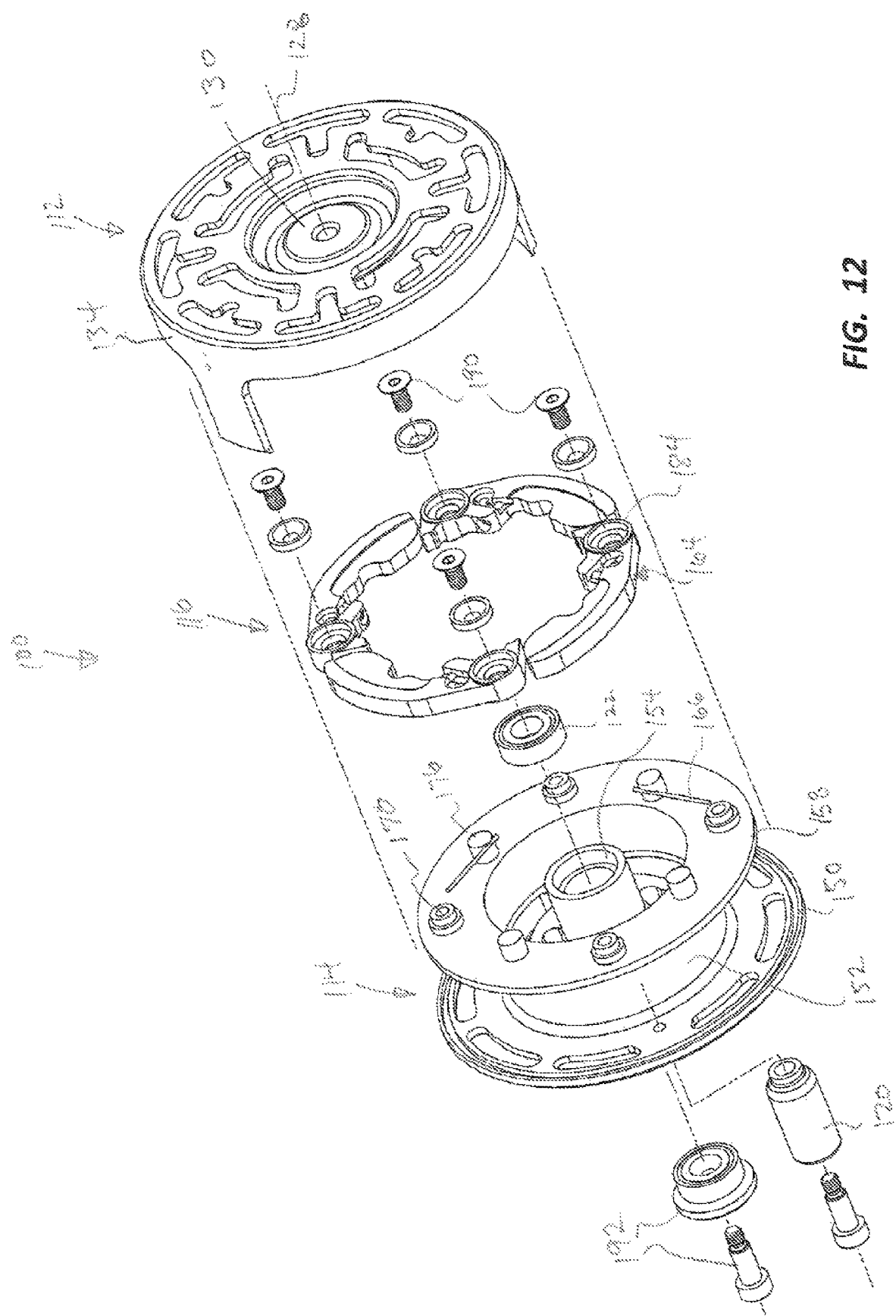
FIG. 12 is an exploded perspective view of the reel arrangement shown in FIG. 11.
Figure 13:
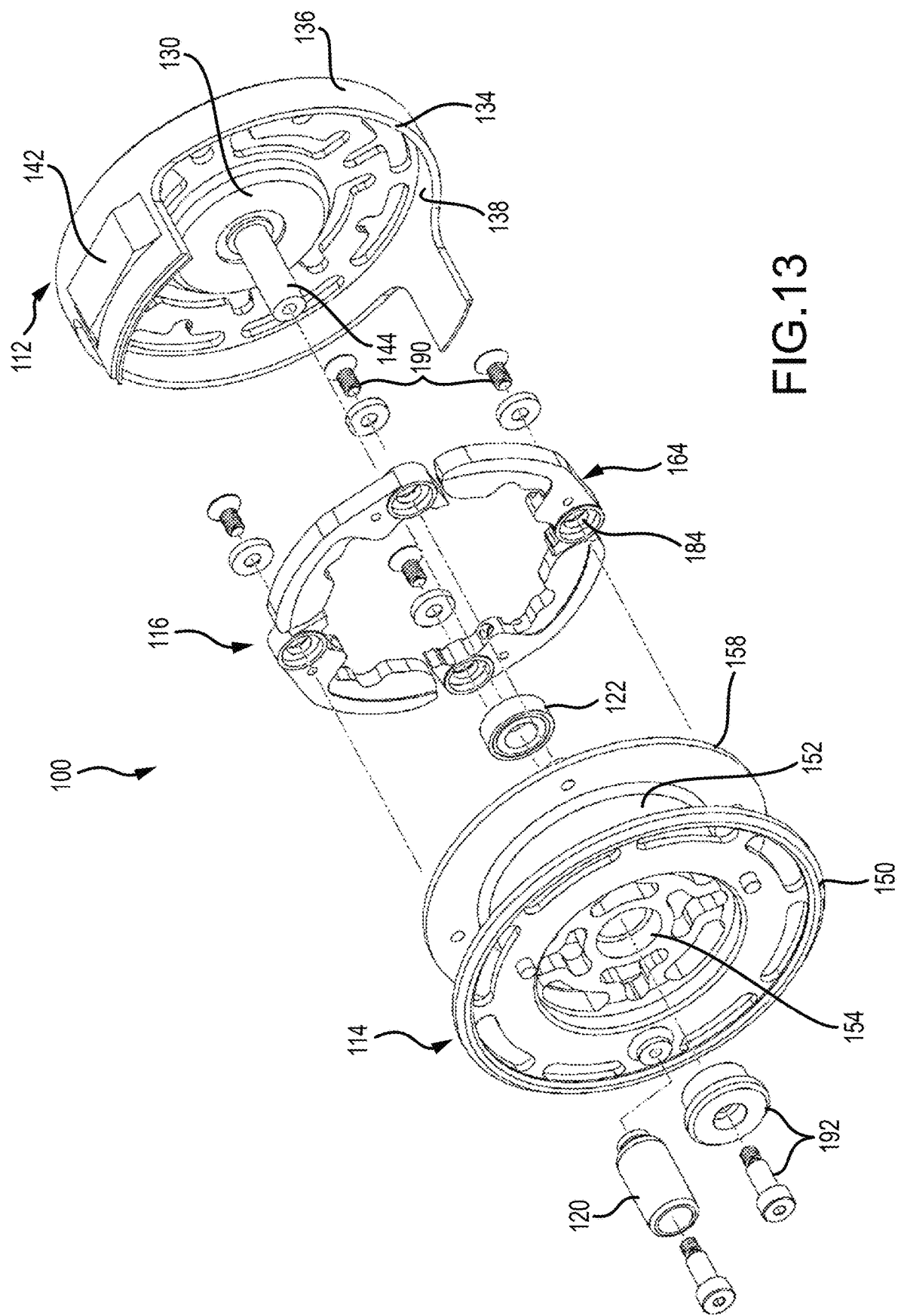
FIG. 13 is another exploded perspective view of the reel arrangement shown in FIG. 11.

Referring now to FIGS. 11-13, another example fishing reel 100 is shown and described. FIG. 11 is a perspective view fishing reel 100, and FIGS. 12 and 13 are separate exploded perspective views. The reel 100 is intended to be mounted to a fishing rod, such as rod 24 shown in FIG. 1. A length of fishing line (e.g., fishing line 26 shown in FIG. 1) is intended to be housed by the reel 100 and fed through the eyelets of the rod.

The fishing reel 100 is shown in FIGS. 11-13 arranged for a right handed use where the user holds the handle portion of the rod 24 with the right hand and operates the reel 100 using the left hand. The reel 100 may be adapted into a left hand arrangement wherein the user grasps the handle of the rod 24 with his left hand and operates the reel 100 with the right hand. Further details regarding the reversibility of the reel 100 between left and right handed arrangements is discussed below.

Referring now to FIG. 11, the fishing reel 100 is shown including a housing 112, a spool 114, and a brake assembly 116 which are connected together using a hub fastener assembly 192. A handle 120 may be mounted to the spool 114 and used by the user to rotate the spool 114 relative to the housing 112 to wrap the fishing line around a portion of the spool 114. The housing 112 may include a rod mount 142, used to secure the fishing reel 100 to a fishing rod, such as the rod 24 shown in FIG. 1. The brake assembly 116 is typically mounted directly to the spool 114, as described in further detail below. The spool 114 with brake assembly 116 mounted thereto is rotatably mounted to the housing 112 via one or more bearings 122. Thus, the housing 112 remains fixed relative to the fishing rod via the rod mount 142, and the spool 114 and brake assembly 116 rotate relative to the housing 112. When the reel 100 is assembled, the brake assembly 116 is enclosed between the housing 112 and spool 114.

FIGS. 12 and 13 show the components of fishing reel 100 in exploded perspective views with the components spaced apart along a longitudinal axis 128. The housing 112 includes a spindle 130, a rim or cage 134 having outer and inner surfaces 136, 138, the rod mount 142 described above, and a bearing shaft 144.

The inner surface 138 of the rim or cage 134 may function as a brake surface against which features of the brake assembly 116 intermittently engage with to provide a braking force that slows down rotation of the spool 114.

The bearing shaft 144 may provide an interface and supporting structure for the bearings 122. In at least one example, the bearings 122 are mounted to the bearing shaft 144. In at least one example, the bearings 122 are press fit or secured with an interference fit to the bearing shaft 144. In other examples, the bearings 122 are secured to the spool 114 using, for example, a press fit or interference fit connection. Other types of connections, such as welding or fasteners, may be possible between the bearings 122 and one or both of the housing 112 and spool 114.

The spool 114 includes a base plate 150, a tube 152, a bearing mount 154, a brake mounting plate 158, and a handle seat 56. The base plate 150 may include a plurality of holes or cavities that may be provided in order to reduce the overall weight of the spool 114. The tube 152 may be configured to have the fishing line 26 wound thereon. The tube 152 may have a variety of different diameters. Typically, the diameter of tube 152 is in the range of about 1 inch to about 3 inches. The diameter of the tube 152 may influence the functionality of the fishing reel 100 such as, for example, the ease of and/or speed of wrapping up the fishing line 26 on the spool 114 relative to the number of rotations of the spool.

The bearing mount 154 may be sized to receive one or both of the bearings 122 therein. The bearing mount 154 may be secured to the tube 152 with one or more struts or supports.

The brake mounting plate 158 may include a plurality of pawl posts 170 that are used to pivotally connected pawls 164 of the brake assembly 116 to the brake mounting plate 158. The brake mounting plate 158 may also include a plurality of spring stops 176 against which spring wires of the brake assembly 116 contact to provide a biasing force to the pawls 164.

The brake mounting plate 158 may be integrally formed as a single piece with the tube 152 and/or other features of the spool 114. In some arrangements, the brake mounting plate 158 is formed as a separate piece that is connected to remaining portions of the spool (e.g., the tube 152) in an assembly step. The brake mounting plate 158 may be permanently mounted to the remaining portions of the spool 114.

The brake assembly 116 includes a plurality of pawls 164 that are mounted to the brake mounting plate 158. Each pawl 164 may be mounted to one of the pawl posts 170 using a fastener 190 that extends through a mounting aperture 184 in the pawls 164. The spring wires 166 associated with each pawl engage the spring stops 176 of the brake mounting plate 158 to bias the pawls into a radially inward position out of contact with the inner surface 138 of the housing 112. The spring wires 166 may be releasably mounted to the pawls 164 using, for example, a spring wire set screw. The spring wires 166 may be mounted to the pawls 164 at one end, thereby providing a cantilevered, resilient spring member, the free end of which contacts one of the spring stops 176 as shown in FIG. 12.

The pawls 164 may be detached from the brake mounting plate 158, flipped 180°, and remounted to the brake mounting plate 158 two switch the reel 100 between the right hand arrangement shown in FIGS. 11-13 and a left hand arrangement for the fishing reel 100.

The pawls 164 and spring wires 166 may have any of the features and functionality of the pawls 64 and spring wires 66 described above with reference to FIGS. 1-10.

The brake assembly 116 may be free of mounting plates (e.g., plates 60, 62, and 158 described herein) to which the pawls 164 and other features of the brake assembly 116 are mounted. Changing the reel 100 between right hand and left hand arrangements may require individually disconnecting and flipping each pawl and its associated spring wire 166 relative to the brake mounting plate 158.

An example method related to operating a fishing reel in accordance with the present disclosure is described. The method may be performed using any of the features or functionality disclosed herein with reference to FIGS. 1-13. The method may include providing a housing, a spool, and a brake assembly mounted to the spool. The spool may be rotatably mounted to the housing. The brake assembly may include a plurality of pivotally mounted pawls. The plurality of pawls may each include a contact surface. The spool may be configured to have a length of fishing line wound thereon. The method may include moving the contact surface of the plurality of pawls into contact with the housing to create a brake force that slows down rotation of the spool upon application of a centrifugal force when the fishing line is pulled by a fish. Moving the contact surface of the plurality of pawls into contact with the housing may include engaging the contact surface against a contoured, radially inward facing surface of the housing. The brake assembly may be reversibly mounted to the spool, and the method may further include mounting the brake assembly to the spool in a first orientation to provide a right-handed fishing reel, detaching the brake assembly from the spool, rotating the brake assembly relative to the spool (i.e., flipping over the brake assembly), and attaching the brake assembly to the spool in a second orientation to provide a left-handed fishing reel. Moving the contact surface of the plurality of pawls into contact with the housing may include moving the plurality of pawls in a radially outward direction. The method may include moving the pawls out of contact with the housing upon reaching a threshold reduced rotational speed for the spool. The fishing reel may further include at least one detent member biased into at least one recess, and rotation of the spool relative to the housing moves the detent into and out of the at least one recess.

The fishing reel and related methods of operation disclosed herein may provide a number of advantages over existing fishing reels. For example, fishing reels disclosed herein may provide, among other things, the following advantages:

Provide little to no startup inertia while providing enough resistance to avoid backlash.

Because there is no official setting that can be controlled by the angler, the guesswork of setting the drag (i.e., adjusting the startup inertia or braking force against the fish) created by conventional reels is eliminated. The reel provides a "real time" braking system rather than a setting from previous fishing trips that may have targeted other species of fish, a setting used for a different size or species of fish on any given fishing trip, or even a setting that the angler believes would be appropriate for a given fishing scenario.

By decreasing startup inertia, the incidence of the line breaking when the fish initially pulls the line is decreased.

The reel will gradually add more braking force as the fish increases speed rather than an immediate, significant braking force as is common with click and pawl reels or disk brake reels. The mechanical advantage of this type of brake system is that the braking force is applied to the line over time and/or a distance the reel spool has traveled during rotation, thus allowing more force to be applied to the line.

Allows the rod to act like a spring that has a constant increase in force rather than a spring that is being pulled hard then allowed to relax and then pulled hard again (i.e., jerky motions).

A design that allows advanced anglers to assemble the parts in a way that allows specific amounts of force for the targeted species (i.e., force that will accommodate the strength of the weakest part of the tackle (i.e., knots in the line)).

The features and function of the reel may encourage anglers to put more and different types of fish on the line using the reel rather considering a reel that is something that "just holds line," thus alleviating the angler's concerns about putting a given fish on line using the reel because there is a fear of the reel breaking the line.

Many other methods related to manufacturing, assembly, operating and adjusting an actuated sand dump system may be carried out using the various embodiments and functionality disclosed herein. This method is exemplary only and may include more or fewer steps in other embodiments.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A fishing reel comprising:
a housing;
a spool comprising at least one brake mount; and
a brake assembly mounted to the spool, the brake assembly including a mounting plate, a backing plate, and a plurality of pawls pivotally, the mounting plate comprising at least one mounting plate spool mount and the backing plate comprising at least one backing plate spool mount;
wherein rotation of the fishing reel causes the plurality of pawls to contact the housing, wherein, in a left-handed reel configuration, the mounting plate is attached to the spool by attaching the at least one mounting plate spool mount directly to the at least one brake mount and the at least one backing plate spool mount is spaced apart from the at least one brake mount, and wherein, in a right-handed reel configuration, the backing plate is attached to the spool by attaching the at least one backing plate spool mount directly to the at least one brake mount and the at least one mounting plate spool mount is spaced apart from the at least one brake mount.

2. The fishing reel of claim 1, wherein the plurality of pawls are biased away from contacting an internal circumferential surface of the housing by a plurality of biasing members.

3. The fishing reel of claim 2, wherein the plurality of biasing members each comprise a flexible wire.

4. The fishing reel of claim 1, wherein the plurality of pawls each include at least two pawls.

5. The fishing reel of claim 1, wherein a contact surface of each of the plurality of pawls is defined by a brake pad.

6. The fishing reel of claim 5, wherein the brake pad comprises a polymer material or a natural material.

7. The fishing reel of claim 6, wherein the brake pad is formed separately and attached to an elongated arm portion of a respective on of the plurality of pawls.

8. The fishing reel of claim 1, further comprising at least one detent member removably positioned in a plurality of recesses as the spool rotates relative to the housing.

9. The fishing reel of claim 8, wherein the at least one detent member is carried by the spool, the plurality of recesses are formed in the housing, and the at least one detent member is biased into a position extending into one of the plurality of recesses.

10. The fishing reel of claim 1, wherein the brake assembly is reversibly mounted to the spool to change the fishing reel from the left-handed reel configuration to the right-handed reel configuration.

11. The fishing reel of claim 1, wherein the spool includes a hollow tube and first and second side plates positioned at opposite ends of the hollow tube, the spool being configured to have a length of a fishing line wound on the hollow tube between the first and second side plates.

12. A fishing reel comprising
a housing having a radially inward facing surface;
a spool configured to have a length of a fishing line wound thereon and being rotatably mounted to the housing, the spool comprising at least one brake mount;
a brake assembly including a mounting plate, a backing plate, and at least one pawl, the at least one pawl having a contact surface arranged to contact the radially inward facing surface to create a braking force that reduces a rotation speed of the spool relative to the housing, the mounting plate comprising at least one mounting plate spool mount and the backing plate comprising at least one backing plate spool mount, wherein, in a left-handed reel arrangement, the mounting plate is attached to the spool by attaching the at least one mounting plate spool mount directly to the at least one brake mount and the at least one backing plate spool mount is spaced apart from the at least one brake mount, and wherein, in a right-handed reel arrangement, the backing plate is attached to the spool by attaching the at least one backing plate spool mount directly to the at least one brake mount and the at least one mounting plate spool mount is spaced apart from the at least one brake mount.

13. The fishing reel of claim 12, wherein the at least one pawl is pivotally mounted to the mounting plate.

14. The fishing reel of claim 13, wherein the at least one pawl includes at least four pawls arranged circumferentially.

15. The fishing reel of claim 12, wherein the at least one pawl is movable into contact with the radially inward facing surface upon application of a centrifugal force when the fishing line is drawn out of the fishing reel by a caught fish.

16. A method of operating a fishing reel, the fishing reel comprising a housing, a spool, and a brake assembly mounted to the spool, the brake assembly including a plurality of pivotally mounted pawls, the method comprising:
mounting the brake assembly to the spool in a first orientation to provide a right-handed fishing reel configuration, wherein, in the right-handed fishing reel configuration, a backing plate is attached to the spool by attaching at least one backing plate spool mount directly to at least one brake mount and at least one mounting plate spool mount is spaced apart from the at least one brake mount;
detaching the brake assembly from the spool;
rotating the brake assembly relative to the spool; and
attaching the brake assembly to the spool in a second orientation to provide a left-handed fishing reel configuration, wherein, in the left-handed fishing reel configuration, a mounting plate is attached to the spool by attaching the at least one mounting plate spool mount directly to the at least one brake mount and the at least one backing plate spool mount is spaced apart from the at least one brake mount.

17. The method of claim 16, further comprising moving a contact surface of the plurality of pivotally mounted pawls into contact with the housing by engaging the contact surface against a contoured, radially inward facing surface of the housing.

18. The method of claim 16, further comprising moving a contact surface of the plurality of pivotally mounted pawls into contact with the housing by moving the plurality of pivotally mounted pawls in a radially outward direction.

19. The method of claim 16, wherein the fishing reel further includes at least one detent member biased into at least one recess, and rotation of the spool relative to the housing moves the at least one detent member into and out of the at least one recess.

20. The method of claim 16, further comprising attaching the plurality of pivotally mounted pawls to the mounting plate.

* * * * *